(12) United States Patent
Reeves

(10) Patent No.: US 6,478,121 B2
(45) Date of Patent: Nov. 12, 2002

(54) DISC BRAKE CALIPER

(75) Inventor: Keith Clarkson Reeves, Mount Eliza (AU)

(73) Assignee: PBR Australia Pty Ltd. (AU)

( * ) Notice: Subject to any disclaimer, the term of this patent is extended or adjusted under 35 U.S.C. 154(b) by 0 days.

(21) Appl. No.: 09/983,673

(22) Filed: Oct. 25, 2001

(65) Prior Publication Data

US 2002/0043435 A1 Apr. 18, 2002

Related U.S. Application Data

(63) Continuation of application No. PCT/AU00/00368, filed on Apr. 26, 2000.

(30) Foreign Application Priority Data

Apr. 26, 1999 (AU) .............................................. PP 9950

(51) Int. Cl.$^7$ .............................................. F16D 55/00
(52) U.S. Cl. ..................................... 188/73.31; 188/258
(58) Field of Search ............................. 188/71.1, 73.31, 188/234, 247, 258, 250 F, 250 G

(56) References Cited

U.S. PATENT DOCUMENTS

| 4,773,290 A | * | 9/1988 | Iwata et al. ................... 82/1.2 |
| 5,485,899 A | * | 1/1996 | Thiel et al. ................. 188/234 |
| 5,957,245 A | * | 9/1999 | Anger et al. ............... 188/71.1 |

FOREIGN PATENT DOCUMENTS

| DE | 197 39 122 A1 | 3/1999 |
| JP | 10-331877 | 12/1998 |
| JP | 11-063041 | 3/1999 |

* cited by examiner

Primary Examiner—Christopher P. Schwartz
Assistant Examiner—Xuan Lan Nguyen
(74) Attorney, Agent, or Firm—Finnegan, Henderson, Farabow, Garrett & dunner

(57) ABSTRACT

A disc brake caliper has a cast metal housing and an anchor bracket which are connected for relative movement during brake actuation. The housing has a bridge section for bridging in use, a disc brake rotor and first and second axially spaced brake pad mounting faces extending substantially perpendicular to the bridge section for disposal in use, on either side of a disc brake rotor and for axial mounting of brake pads thereagainst. First and second inner finger radiuses extend respectively at the junction between the bridge section and each of the first and second brake pads mounting faces for radially supporting a portion of the periphery of a brake pad. Piston actuating means are provided for axially displacing the first brake pad away from the first brake pad mounting face into engagement with a disc brake rotor. Each of the first and second brake pad mounting faces and said inner finger radiuses are machined over the surfaces of contact with the brake pads. The second inner finger radius between the bridge section and the second brake pad mounting face includes raised sections at each end thereof relative to the section extending therebetween.

21 Claims, 8 Drawing Sheets

DISC BRAKE CALIPER

CROSS REFERENCE TO RELATED APPLICATIONS

This application is a continuation of international application number PCT/AU00/00368, filed Apr. 26, 2000, the content of which is incorporated herein by reference, and claims the priority of Australian Patent Application No. PP 9950, filed Apr. 26, 1999.

BACKGROUND OF THE INVENTION

1. Field of the Invention

The present invention relates to a disc brake caliper for use in automotive vehicles and in particular to a new construction of such a caliper.

Disc brake calipers are well known in the automotive industry. Indeed most vehicles manufactured at least in recent years include disc braking arrangements which employ disc brake calipers. While disc brake calipers of various manufacturers will vary in relation to specific aspects of their calipers, the calipers generally have a similar overall shape, because they are mostly required to fit within the same overall type of structure. That is, almost universally, the caliper is required to fit within a wheel cavity, and about a rotor that rotates with the wheel. Thus, the overall shapes of calipers in general are, to a large extent, relatively similar and are dictated by the space available within the wheel cavity for positioning of the caliper.

2. Description of the Related Art

FIG. 1 shows the general shape of a prior art caliper 10, and that caliper includes a housing 11 and an anchor bracket 12. The housing 11 is movable relative to the anchor bracket 12 during brake actuation. In the FIG. 1 caliper the housing 10 includes three fingers 13 which depend substantially perpendicular from a bridge section 14 thereof, that in turn depends from a piston mounting section 15. The piston mounting section 15 extends in a plane substantially parallel to the plane of the fingers 13. The piston mounting section 15 includes a pair of elongate mounting shafts on which the anchor bracket 12 is mounted for relative movement in the direction A. While the mounting shafts cannot be seen in FIG. 1 due to their accommodation within the housing 11 and the anchor bracket 12, the shafts extend coaxially with openings formed in the arms 16 of the piston mounting section 15 and are fixed thereto by a head and nut arrangement 17, 18. That arrangement is only shown on one side of the caliper 10, but an identical arrangement at the other end 19 of the mounting section 15 is provided for the other of the two mounting shafts.

The disc brake caliper 10 is provided with a pair of brake pads on which a friction lining is mounted and those pads are forced into engagement with the disc rotor when a braking force is applied. Operation of the caliper 10 in this manner would be well understood by a person skilled in the art and is therefore not important for the purposes of the present invention. Instead, it is the particular construction of the caliper which is important and which will be the subject of the following description.

The housing 11 and the anchor bracket 12 of the brake caliper 10 are normally cast from metal. Casting the caliper housing and anchor bracket is appropriate from a manufacturing point of view, but in some cases the castings are tumbled or shot blasted after solidification to remove surface imperfections. In so doing a residual compressive stress is introduced into the surface which is the subject of that treatment, which advantageously can provide increased resistance to fatigue failure. However, subsequent machining of the cast surface which has been treated in the above described manner, has the effect of removing the metal imparted with residual compressive stress and that has the undesirable effect of reducing the fatigue strength of the casting in the machined area. For the most part, the surface finish which can be obtained by casting is satisfactory for the use to which the caliper is put. However, some surfaces require a more precise surface finish and in particular, the surfaces against which the brake pads are mounted require a smoother, flatter surface finish than is possible through normal casting techniques and therefore, those surfaces are normally machined. FIGS. 2 and 3 show by shading, the surfaces of the caliper 10 of FIG. 1 that would normally be machined for mounting of the pair of brake pads.

In FIG. 2, it can be seen that the machining takes place in the junction of the caliper 10 between the fingers 13 and the bridge 14, which is a section of the caliper formed as an arc, that is known to applicant as the "inner finger radius" and that terminology will be used to describe that section of the caliper throughout this specification. Before machining, the inner finger radius is cast as a raised bead 20 between the inner surfaces of the bridge 14 and the fingers 13, which is then machined for mounting of the brake pad. The bead 20 is machined to form an arcuate surface extending from adjacent one edge 21 of the housing 11 to adjacent an opposite edge 22. The machined surface is shaded in FIG. 2 and is identified by the reference numeral 23. The machined surface 23 is interrupted midway between the respective edges 21 and 22 by a gap 24, which is provided for location of a brake pad thereagainst.

FIG. 3 illustrates the same housing 11 shown in FIGS. 1 and 2, but at a different angle to show the inside surface of the piston mounting section 15. Like FIG. 2, the machined surfaces are identified by shading.

A disadvantage with calipers manufactured to the above construction, is that machining of the bead formed in the inner finger radius results in an increased propensity for the caliper to fail in that area, because machining of that kind causes a localised reduction in the fatigue strength of the caliper as described earlier. That is, localised reduction of fatigue strength occurs due to removal by machining of residual compressive stress in the surface of the casting and also by the introduction of irregularities, such as scratches and notches that occur in the machined surface during the machining process. The fatigue strength of the caliper in the machined region can be recovered to some extent by work hardening of the surface, such as by shot peening, but that adds considerably to the cost of the caliper manufacture. It has been found that fatigue failure in this type of caliper 10, most often occurs in the machined section of the inner finger radius at either end 21 or 22 thereof.

Calipers are also required to be designed for maximum stiffness, as any deflection of the caliper during braking, reduces the effectiveness of the caliper performing that function. Stiffness can be increased by increasing the thickness of the caliper in those sections that are most likely to deflect, but the maximum thickness of a caliper is governed by the need to fit the caliper within the confined wheel cavity of the and the preference to maintain the rotor at as large a diameter as possible, for maximum braking efficiency. Thus the thickness of the caliper is required to be minimised as far as possible.

It is an object of the invention to provide a disc brake caliper which has a reduced propensity for fatigue failure. It is a further object of the invention to provide a disc brake caliper which has a reduced propensity for fatigue failure in the inner finger radius. It is still a further preferred object of the invention to provide a disc brake caliper that has improved stiffness.

SUMMARY OF THE INVENTION

According to the present invention there is provided a disc brake caliper having a cast metal housing and an anchor bracket which are connected for relative movement during brake actuation, said housing having a bridge section for bridging in use, a disc brake rotor and first and second axially spaced brake pad mounting faces extending substantially perpendicular to said bridge section for disposal in use, on either side of a disc brake rotor and for axial mounting of brake pads thereagainst, first and second inner finger radiuses extending respectively at the junction between said bridge section and each of said first and second brake pad mounting faces for radially supporting a portion of the periphery of a said brake pad, piston actuating means being provided for axially displacing a said brake pad away from said first brake pad mounting face into engagement with a disc brake rotor, each of said first and second brake pad mounting faces and said inner finger radiuses being machined over the surfaces of contact with the brake pads, said second inner finger radius between said bridge section and said second brake pad mounting face including raised sections at each end thereof relative to the section extending therebetween.

In a preferred arrangement, the inner finger radius includes a pair of unmachined sections extending inwardly circumferentially from either end of the inner finger radius and at least one machined section extending between the unmachined sections.

The use of the terms "machined" and "unmachined" is used to identify sections of the caliper that are surface finish treated and untreated respectively, following the casting process used to form the relevant part of the caliper. Thus, the use of the term "machined" in relation to a certain part of the caliper, will identify that part as having been surface treated, such as by milling, grinding and/or polishing, to remove metal therefrom. A part of the caliper that is defined as being "unmachined" will not have been surface treated in this manner, although it may have been subject to other treatments, such as shot peening , shot blasting , surface hardening, heat tempering etc.

A disc brake caliper according to the invention advantageously has increased resistance to fatigue failure in the regions in which prior art calipers are most prone to fail, ie at each circumferential end of the inner finger radius. Additionally, in the raised sections of the inner finger radius, the caliper has a greater cross-sectional thickness and in those sections, the strength and stiffness of the caliper is greater than in the reduced section. Thus, the overall strength and stiffness of the caliper is also increased. These benefits are however, realised without necessitating large changes to the shape or configuration of the caliper, or to the shape of the brake pads, and a caliper according to the invention is not envisaged to require substantial manufacturing changes to those traditionally employed.

In a preferred embodiment of the invention, the inner finger radius is cast so that the raised sections extend axially inwardly, toward the piston mounting section of the caliper, so as to increase the cross-sectional thickness of the caliper in those sections and thus further increase the strength and stiffness of the caliper. The axial extent of the raised sections preferably should not exceed the thickness of the brake pad backing plate which is mounted against the fingers, otherwise in use, the rotor may come into contact with those sections when the friction lining attached to the pad is fully worn.

The invention has application to calipers employing any number of piston actuators. The prior art caliper illustrated in FIGS. 1 to 3 includes two piston actuators which would be mounted in cylinders 25 and 26 respectively (see FIG. 3) and the invention has been developed principally in relation to this type of caliper. However, the invention equally has application to calipers having a single piston actuator, or calipers having three or more actuators.

With respect to a caliper having two piston actuators, in a preferred embodiment of the invention, the inner finger radius includes a further raised section substantially intermediate the ends of the inner finger radius. That section may also have an inward axial extent equal to approximately the thickness of the brake pad fitted thereto. The existence of a third such section further enhances the strength and stiffness of the brake caliper in the region of the inner finger radius.

In a further preferred embodiment of the invention, the section of the caliper provided for mounting a brake pad opposite the pad mounted against the caliper fingers, also includes a pair of raised sections extending circumferentially inwardly to a reduced section extending therebetween. Moreover, where the caliper includes provision for two or more piston actuators, a reduced section may be disposed intermediate each piston actuator. The raised sections of this part of the caliper advantageously can be extended axially inwardly toward the fingers of the caliper a greater distance than the complimentary sections of the inner finger radius, given that actuation of the caliper causes movement of the brake pad mounted against the piston mounting section, away from that section.

BRIEF DESCRIPTION OF THE DRAWINGS

The attached drawings show an example embodiment of the invention of the foregoing kind. The particularity of those drawings and the associated description does not supersede the generality of the preceding broad description of the invention.

FIG. 9 is an end view through IX—IX of FIG. 8.

DETAILED DESCRIPTION OF THE PREFERRED EMBODIMENTS

Figure 3:
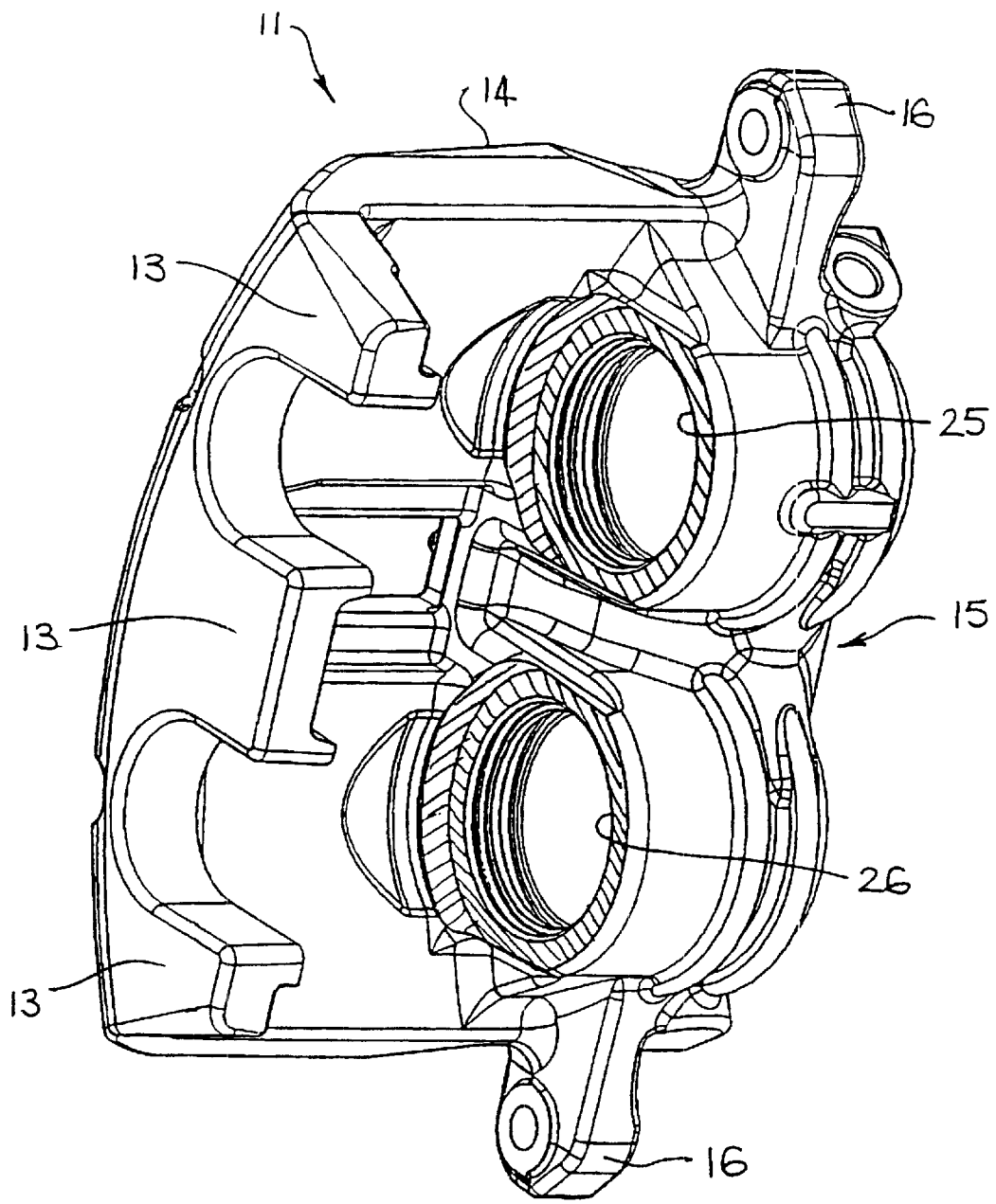
Figure 4:
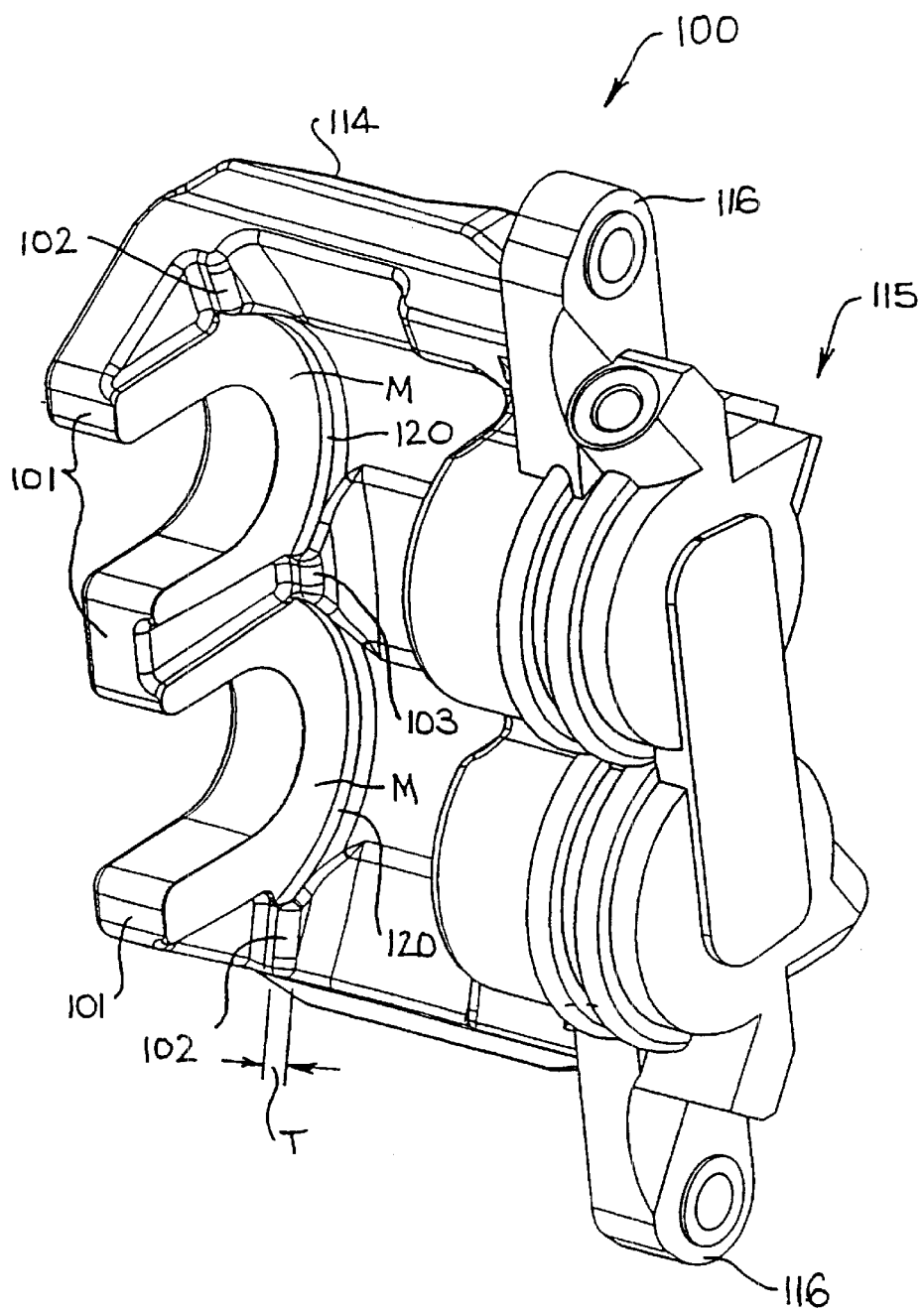
FIG. 4 is a perspective view of a disc brake caliper according to one embodiment of the invention.

FIG. 4 shows a caliper housing 100 according to the invention and showing the housing 100 at an angle to view the inside surface of the fingers 101. Many of the features of the calliper housing 100 are the same as that shown in FIGS. 1 to 3 and therefore, like parts will be identified by the same reference numeral, plus 100. As seen in FIG. 4, the inside finger surfaces are machined for abutting engagement with the rear surface of a brake pad. However, the machining is conducted in a different manner to that of the prior art arrangement shown in FIGS. 1 to 3 as will be now explained.

Figure 1:
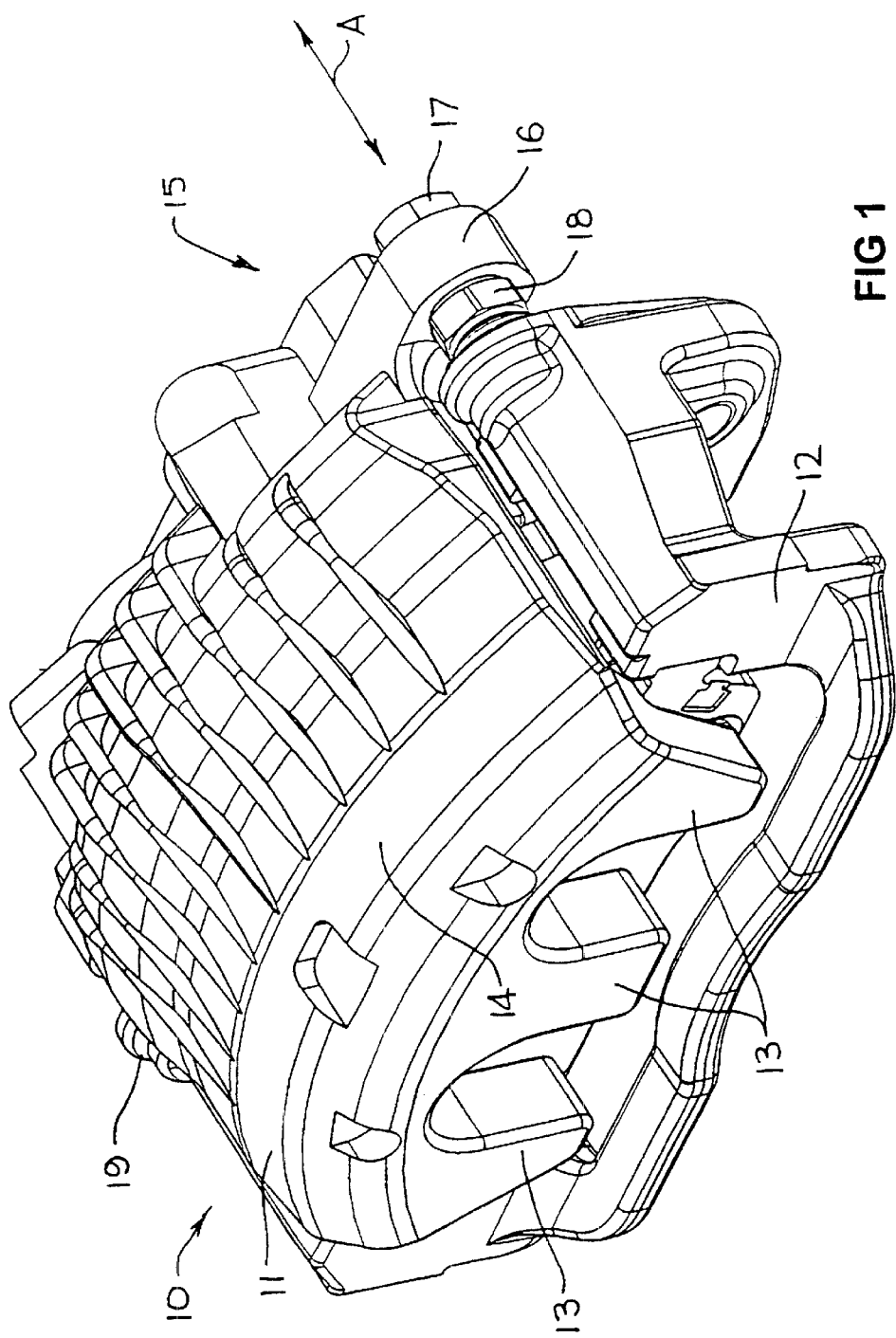
FIGS. 1 to 3 show prior art disc brake caliper arrangements.
Figure 2:
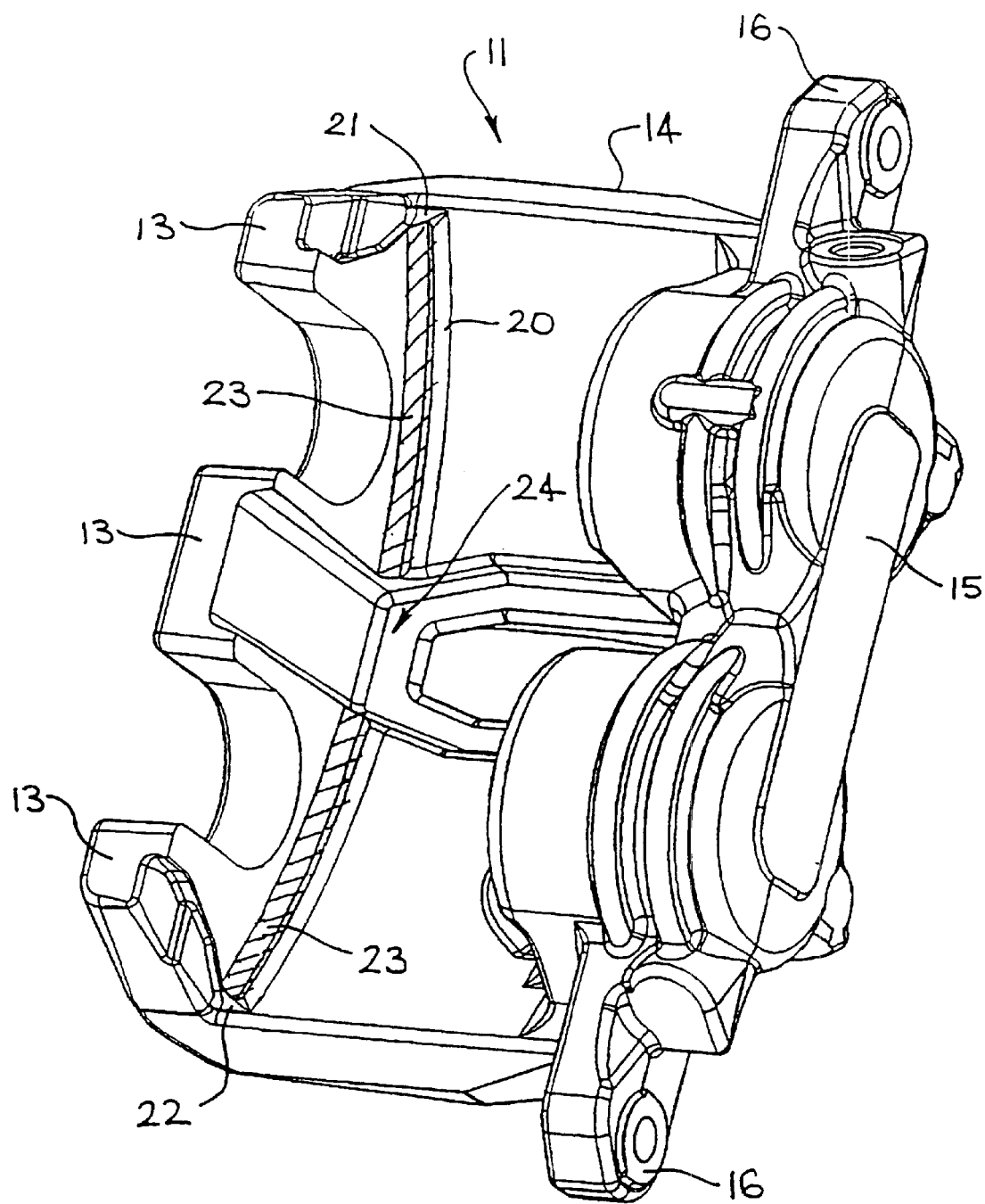

In the caliper 100 of FIG. 4, the invention is embodied in the construction of the inner finger radius, which can be seen to differ dramatically from the inner finger radius shown in FIGS. 1 to 3. The inner finger radius is not formed as an arc as in prior art calipers of the kind shown in FIGS. 1 to 3, but instead, in the FIG. 4 embodiment, machining of the fingers 101 and the inner finger radius is conducted in a substantial U-shaped configuration. The machined surfaces are substantially identical and are identified by the letter "M". It is clear from FIG. 4, that the machined surfaces M do not extend for the full circumferential extent of the inner finger radius. In particular, each end 102 of the inner finger radius remains in the cast form or in other words, is not machined in the operation that forms each of the machined surfaces M. Thus, each end 102 forms a raised section relative to the arcuate surface 120 of the machined surface M. In the arrangement shown, each end 102 of the inner finger radius retains the cast bead shape that extends throughout the inner finger radius prior to machining.

The sections of the inner finger radiuses that are not machined and therefore remain as cast, may be surface treated to introduce residual compressive stresses into the surface thereof.

Additionally, the inner finger radius shown in FIG. 4 is unmachined at the position intermediate the two machined surfaces M, which is identified by the reference numeral 103. Like the ends 102, the intermediate section 103 remains in the cast form of the inner finger radius prior to machining of the surfaces M.

The thickness T of the inner finger radius is equal to, or preferably slightly less than the thickness of the brake pad backing plate which is fitted against the machined surfaces M. The existence of the unmachined sections 102 strengthen the caliper 100 against fatigue failure in those sections, which are most prone to fatigue failure in the type of caliper shown. Additionally, the increased thickness of the caliper 100 in the sections 102 increases the stiffness of the caliper compared to a known caliper such as that shown in FIGS. 1 to 3. The existence of the unmachined section 103 further increases the resistance of the inner finger radius to fatigue failure, as well as the stiffness of the caliper.

The benefit of a caliper manufactured according to FIG. 4, is in the increased stiffness and strength thereof. That benefit is realised without dramatically altering the shape or manufacture of the caliper and advantageously utilises characteristics of the caliper which exist under normal caliper construction. That is, the increase in stiffness and strength is achieved by retaining a portion of the caliper which is formed during casting, but which has otherwise normally been removed by machining.

Figure 5:
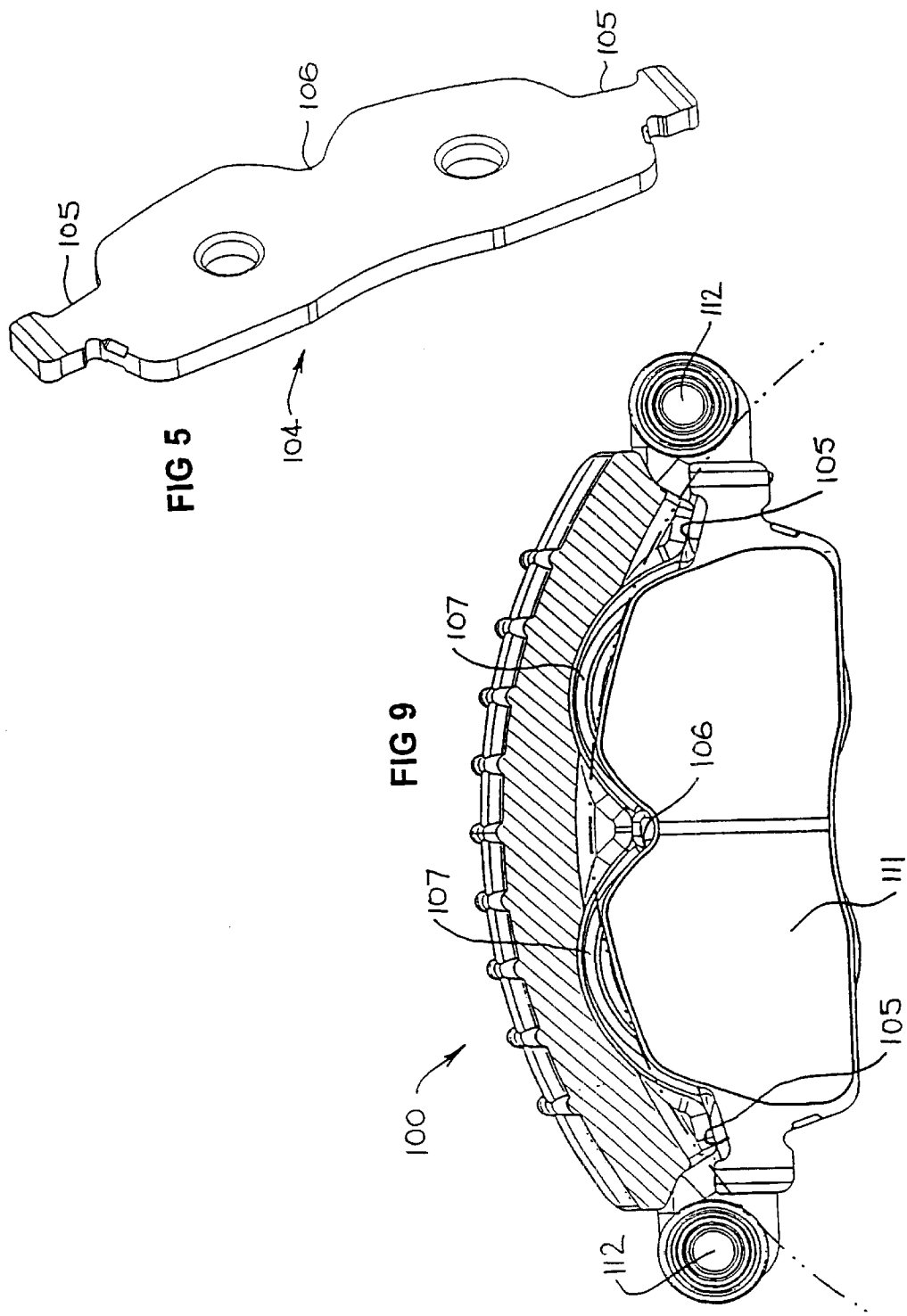
FIG. 5 is a perspective view of the backing plate of a brake pad for use with the disc brake caliper of FIG. 4.

Manufacture of a caliper element 100 requires a different shaped brake pad compared to that of known calipers. Such a brake pad 104 is illustrated in FIG. 5 and this pad includes recessed sections 105 and 106 for accommodating the sections 102 and 103 of the caliper element 100. The pad shown in FIG. 5 is easily manufactured using known techniques and therefore does not represent an obstacle to the adoption of a caliper of the present invention.

Figure 6:
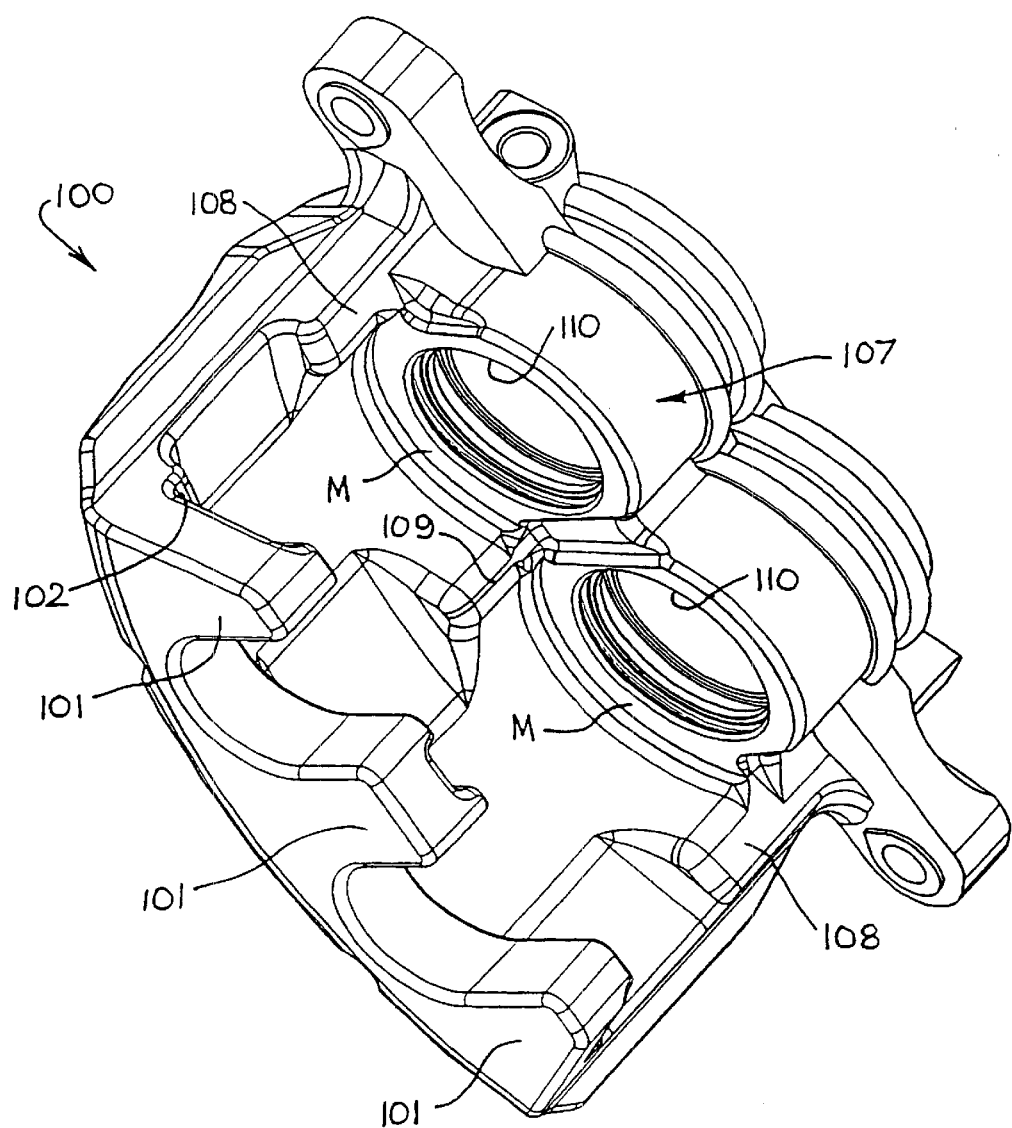
FIG. 6 is an alternative view of the disc brake caliper of FIG. 4.

FIG. 6 is a view of the caliper element 100 showing the inside face of the piston mounting section 107. From this figure, it can be seen that a similar machining operation has been conducted on the inside face of the piston mounting section to create two machined sections M. At either end of the inner face of the piston mounting section 107, cast sections 108 extend axially inwardly toward the fingers 101. Additionally, between the machined surfaces M, an intermediate cast section 109 extends axially inwardly. The inward axial extent of the cast sections 108 and 109 is greater than that of the inner finger radius sections 102 and 103 because in use, the pistons mounted in the cylinders 110 of the piston mounting section 107, axially move the brake pad away from the machined surfaces M under brake actuation. That movement is at a maximum distance when the friction lining attached to the brake pad is nearing full wear in which the forward surface of the brake pad is moved during brake actuation to a position in which it extends just forward of the axially forward end of each of the sections 108 and 109.

Advantageously, the greater extent of the sections 108 and 109 compared to the sections 102 and 103, provides for a greater enhancement of the strength and stiffness of the caliper in the regions in which they extend, again without altering to any significant extent the method by which the caliper is manufactured, or the general shape of the caliper as formed. A brake pad similar to that shown in FIG. 5, would be required to suit the new configuration of the inner face of the piston mounting section 107.

Figure 7:
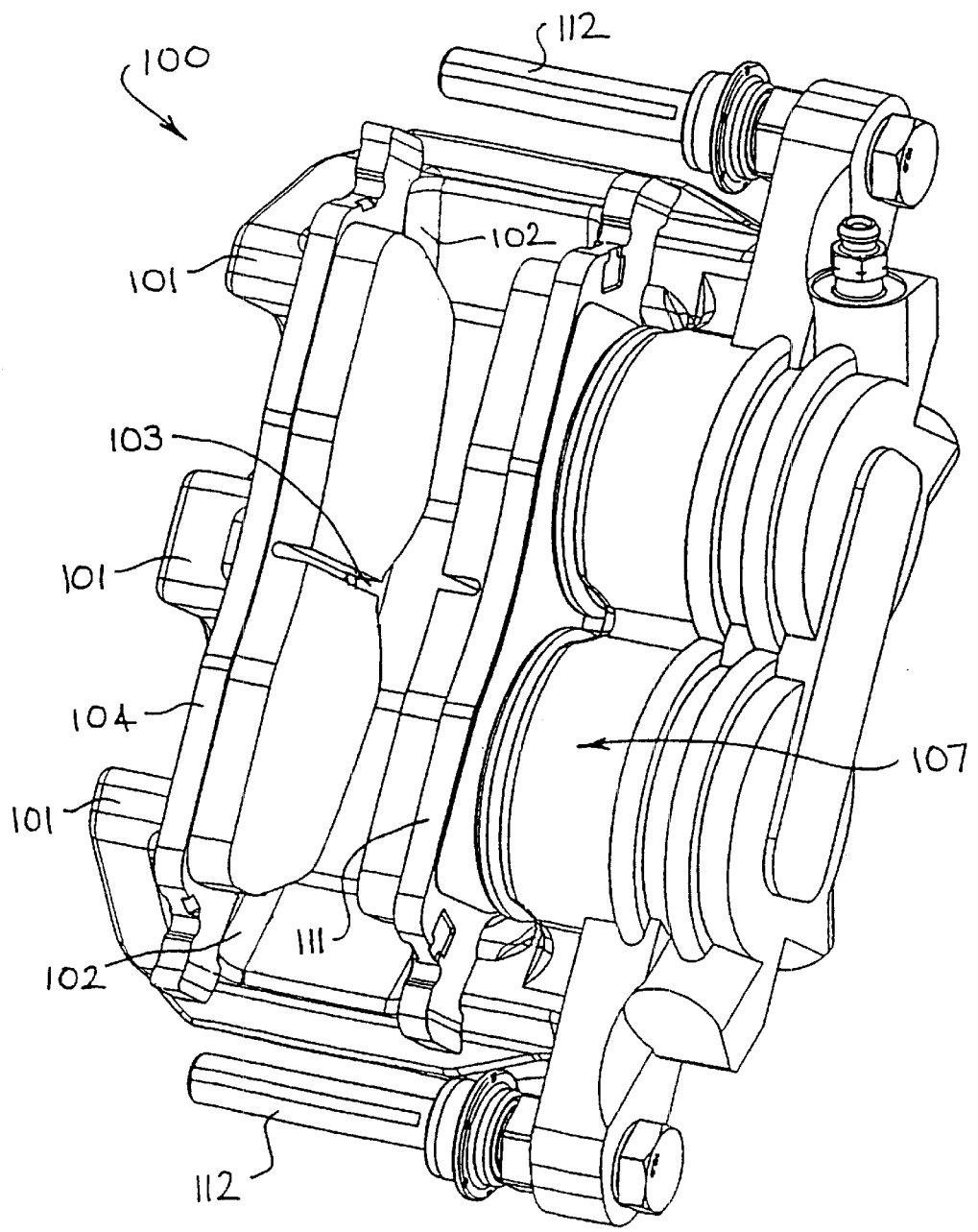
FIG. 7 is a view of the disc brake caliper of FIG. 4 with a pair of brake pads installed.

FIG. 7 shows the brake caliper element 100 in the same view as FIG. 4, but with the brake pad 104 of FIG. 5 fitted against the inside machined surfaces M of the fingers 101. FIG. 7 also shows a brake pad 111 fitted to the machined surfaces of the piston mounting section 107. FIG. 7 further shows the shafts 112 to which an anchor bracket similar to that shown in FIG. 1 is connected.

Figure 8:
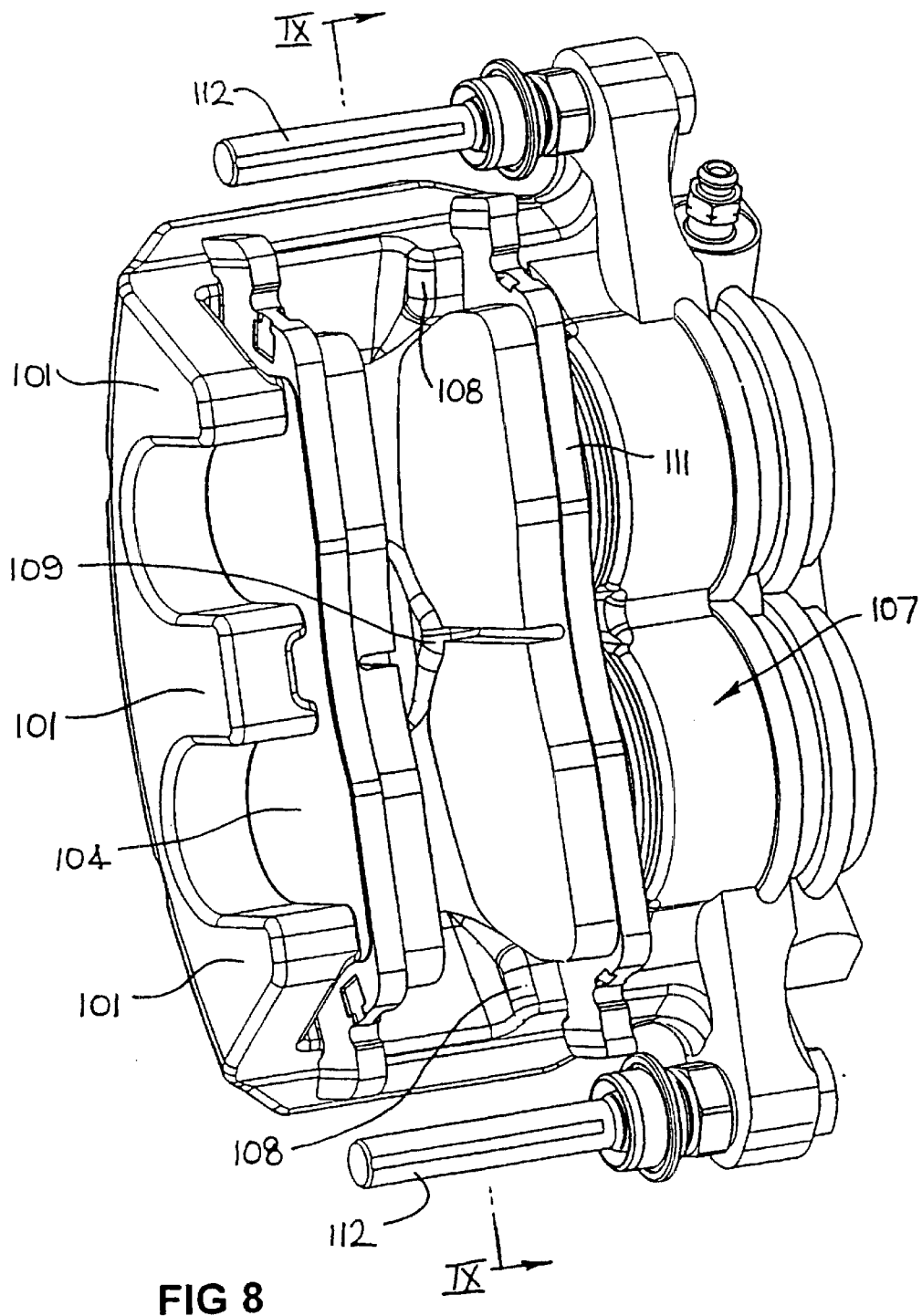
FIG. 8 is an alternative view of the disc brake caliper of FIG. 7.

FIG. 8 shows the caliper element and brake pad arrangement of FIG. 7, but from a view facing the inside surface of the piston mounting section 107. Unmachined cast sections 108 and 109 can be seen in this view.

FIG. 9 is a view looking directly at the brake pad 111 of FIGS. 7 and 8. The path of the rotor through the caliper element 100 is shown in dot outline.

The invention as hereinbefore described provides significant benefits to the operation and performance of brake calipers. The advance over the prior art is one which facilitates greater security in the structural integrity of the caliper, with relatively minor changes to the structure and manufacture of the caliper. Thus, the invention is advantageous in that the benefits can be realised without substantial if any, increases in material or manufacturing cost.

The invention described herein is susceptible to variations, modifications and/or additions other than those specifically described and it is to be understood that the invention includes all such variations, modifications and/or additions which fall within the spirit and scope of the above description.

What is claimed is:

1. A disc brake caliper having a cast metal housing and an anchor bracket which are connected for relative movement during brake actuation, said housing having a bridge section for bridging in use, a disc brake rotor and first and second axially spaced brake pad mounting faces extending substantially perpendicular to said bridge section for disposal in use, on either side of a disc brake rotor and for axial mounting of brake pads thereagainst, first and second inner finger radiuses extending respectively at the junction between said bridge section and each of said first and second brake pad mounting faces for radially supporting a portion of the periphery of a said brake pad, piston actuating means being provided for axially displacing a said brake pad away from said first brake pad mounting face into engagement with a disc brake rotor, each of said first and second brake pad mounting faces and said inner finger radiuses being machined over the surfaces of contact with the brake pads, said second inner finger radius between said bridge section and said second brake pad mounting face including raised sections at each end thereof relative to the section extending therebetween, and a further raised section substantially intermediate said raised end sections thereof.

2. A disc brake caliper according to claim 1, said first inner finger radius between said bridge section and said first brake pad mounting "face" including raised sections at each end thereof relative to the section extending therebetween.

3. A disc brake caliper according to claim 2, said first inner finger radius including a further raised section substantially intermediate said end sections thereof.

4. A disc brake caliper according to claim 2, wherein the axial extent of said raised sections of said first inner finger radius from said first brake pad mounting face toward said second brake pad mounting face does not exceed the maximum displaced position of the leading face of the backing plate of the brake pad which is to be mounted against said first brake pad mounting face.

5. A disc brake caliper according to claim 2, said first inner finger radius including raised end sections and a raised intermediate section, and wherein between said end sections and said intermediate section said first inner finger radius has arcuately formed machined surfaces.

6. A disc brake caliper according to claim 1, wherein one or more of said raised sections are formed by sections of the respective inner finger radiuses that are not machined and so remain as cast.

7. A disc brake caliper according to claim 6, wherein one or more of said raised sections have residual compressive stresses introduced into the surface thereof by surface treatment after casting.

8. A disc brake caliper according to claim 1, wherein the axial extent of said raised sections of said second inner finger radius from said second brake pad mounting face toward said first brake pad mounting face does not exceed the thickness of the backing plate of the brake pad that is to be mounted thereagainst.

9. A disc brake caliper according to claim 1, wherein between said end sections and said intermediate section said second inner finger radius has arcuately formed machined surfaces.

10. A brake pad in combination with a disc brake caliper according to claim 1.

11. A disc brake caliper having a cast metal housing and an anchor bracket which are connected for relative movement during brake actuation, said housing having a bridge section for bridging in use, a disc brake rotor and first and second axially spaced brake pad mounting faces extending substantially perpendicular to said bridge section for disposal in use, on either side of a disc brake rotor and for axial mounting of brake pads thereagainst, first and second inner finger radiuses extending respectively at the junction between said bridge section and each of said first and second brake pad mounting faces for radially supporting a portion of the periphery of a said brake pad, piston actuating means being provided for axially displacing a said brake pad away from said first brake pad mounting face into engagement with a disc brake rotor, each of said first and second brake pad mounting faces and said inner finger radiuses being machined over the surfaces of contact with the brake pads, said first inner finger radius between said bridge face and said first brake pad mounting "face" including raised sections at each end thereof relative to the section extending therebetween, and said second inner finger radius between said bridge section and said second brake pad mounting face including raised sections at each end thereof relative to the section extending therebetween.

12. A disc brake caliper according to claim 11, said second inner finger radius including a further raised face substantially intermediate said raised end sections thereof.

13. A disc brake caliper according to claim 11, said first inner finger radius including a further raised section substantially intermediate said end sections thereof.

14. A disc brake caliper according to claim 11, wherein one or more of said raised sections are formed by sections of the respective inner finger radiuses that are not machined and so remain as cast.

15. A disc brake caliper according to claim 14, wherein one or more of said raised sections have residual compressive stresses introduced into the surface thereof by surface treatment after casting.

16. A disc brake caliper according to claim 11, wherein the axial extent of said raised sections of said second inner finger radius from said second brake pad mounting face toward said first brake pad mounting face does not exceed the thickness of the backing plate of the brake pad that is to be mounted thereagainst.

17. A disc brake caliper according to claim 11, wherein the axial extent of said raised sections of said first inner finger radius from said first brake pad mounting face toward said second brake pad mounting face does not exceed the maximum displaced position of the leading face of the backing plate of the brake pad which is to be mounted against said first brake pad mounting face.

18. A disc brake caliper according to claim 11, wherein between said end sections and said intermediate section said second inner finger radius having arcuately formed machined surfaces.

19. A disc brake caliper according to claim 11, said first inner finger radius including raised end sections and a raised intermediate section, and wherein between said end sections and said intermediate section said first inner finger radius having arcuately formed machined surfaces.

20. A brake pad for use with a disc brake caliper according to any one of claim 11.

21. A disc brake caliper having a cast metal housing and an anchor bracket which are connected for relative movement during brake actuation, said housing having a bridge section for bridging in use, a disc brake rotor and first and second axially spaced brake pad mounting faces extending substantially perpendicular to said bridge section for disposal in use, on either side of a disc brake rotor and for axial mounting of brake pads thereagainst, first and second inner finger radiuses extending respectively at the junction between said bridge section and each of said first and second brake pad mounting faces for radially supporting a portion of the periphery of a said brake pad, piston actuating means being provided for axially displacing a said brake pad away from said first brake pad mounting face into engagement with a disc brake rotor, each of said first and second brake pad mounting faces and said inner finger radiuses being machined over the surfaces of contact with the brake pads, said second inner finger radius between said bridge face and said second brake pad mounting face including raised sections at each end thereof relative to the section extending therebetween, and a further raised intermediate section, and wherein between said end sections and said intermediate section said second inner finger radius having arcuately formed machined surfaces.

* * * * *

UNITED STATES PATENT AND TRADEMARK OFFICE
CERTIFICATE OF CORRECTION

PATENT NO. : 6,478,121 B2
DATED : November 12, 2002
INVENTOR(S) : Keith Clarkson Reeves It is certified that error appears in the above-identified patent and that said Letters Patent is hereby corrected as shown below:

<u>Title page,</u>
Item [74], in the name of the *Firm*, "dunner" should read -- Dunner --.

<u>Column 7,</u>
Line 13, ""face"" should read -- face --.
Line 67, "face" should read -- section --.

<u>Column 8,</u>
Line 1, ""face"" should read -- face --.
Line 32, before "wherein", insert -- said second inner finger radius including raised end sections and a raised intermediate section, and --.
Line 42, should read -- A brake pad in combination with a disc brake caliper according to claim 1. --
Line 59, "face" should read -- section --.

Signed and Sealed this

Fifteenth Day of April, 2003

JAMES E. ROGAN
*Director of the United States Patent and Trademark Office*